Patented Jan. 1, 1924.

1,479,089

UNITED STATES PATENT OFFICE.

CHARLES R. SHORT, OF DETROIT, MICHIGAN, ASSIGNOR TO GENERAL MOTORS CORPORATION, OF DETROIT, MICHIGAN, A CORPORATION OF DELAWARE.

PISTON PACKING.

Application filed December 1, 1919. Serial No. 341,746.

*To all whom it may concern:*

Be it known that I, CHARLES R. SHORT, a subject of the King of Great Britain, and a resident of Detroit, county of Wayne, and State of Michigan, have invented certain new and useful Improvements in Piston Packings, of which the following is a full, clear, concise, and exact description, such as will enable others skilled in the art to which the invention relates to make and use the same, reference being made therein to the accompanying drawings, which form a part of this specification.

The invention relates to piston packing of the type comprising a plurality of rings inserted in a groove in the piston, and is especially designed for use in connection with the pistons of internal combustion engines.

In piston packing of the kind generally employed in such engines, one-piece rings are made of approximately the same width as the groove in the piston, and are held outwardly against the cylinder wall by their own resilience. Rings of this type however, although they may fit closely to the wall of the cylinder, have no provision for maintaining a tight fit with the walls of the groove itself. Leakage and pumping of oil therefore take place around the ring within the groove. It has been proposed to remedy this defect by the use of divided rings or a plurality of rings in the same groove so arranged that a tight fit is produced both with the cylinder wall and with at least one wall of the groove by the interaction of the ring members.

My invention has to do with packing of this character, and its object is to provide an improved construction of rings as hereinafter more fully set forth.

In the accompanying drawings forming a part of this specification:

Figure 1:
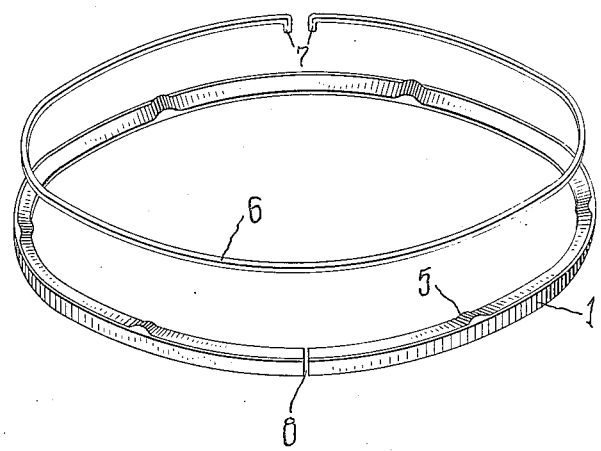
Fig. 1 is a perspective view of the rings which embody one form of my invention.

In the drawings, 1 is a resilient packing ring, split at 8, as is customary, and of approximately triangular or possibly trapezoidal cross-section. The exterior of this ring conforms to the interior of the cylinder 2, the one side is adapted to fit one side of the groove 3 in piston 4, and the other side whose surface is at an oblique angle to the axis of the ring is provided with a plurality of ribs 5. A spring ring 6, shown in Fig. 2 as of generally triangular section with rounded edges, is adapted to lie in the portion of the piston groove not occupied by ring 1. The spring ring 6 is provided at its ends with bent portions 7, adapted to be positioned between any two of the ribs 5 and thereby prevent relative rotative movement of the rings. The ring 6 when in assembled relationship with ring 1, will rest against the ribs 5, whereby several points of engagement may be obtained upon the inner side of the ring in order to exert an even pressure upon the cylinder wall.

Figure 2:
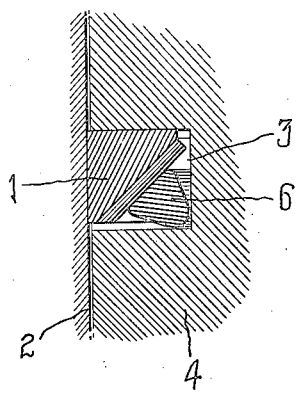
Fig. 2 is a sectional view showing a portion of a piston and cylinder with the rings in assembled position.
Figure 3:
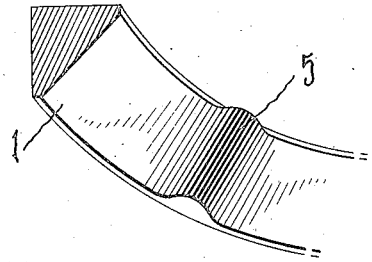
Fig. 3 is an enlarged detail view.
Figure 4:
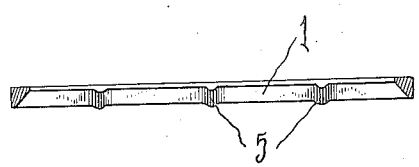
Fig. 4 is a section showing the main packing ring.

It will be seen that, owing to the angles of the engaging surfaces, as shown in Fig. 2, the ring 6 will tend to force ring 1 into engagement both with the cylinder wall and with one wall of the piston groove, thereby completely packing the joint, and that any wear will be taken up by a readjustment of the relative positions of the two rings owing to their resilience.

While I have described in detail one embodiment of my invention, it will be understood that modifications may be made within the scope of the invention and I do not desire to be limited to the exact construction shown.

I claim:

1. In a piston packing, the combination with a resilient split ring having a surface on its inner side oblique to the axis of the ring, said surface provided with raised bearing portions arranged at intervals around the ring, of a resilient split expanding ring adapted to be placed with said first mentioned ring in a piston groove and to seat on said bearing portions, the relation of the engaging surfaces being such that the expanding ring will operate to force the first mentioned ring outwardly and axially when said rings are seated in a piston groove.

2. In a piston packing, the combination of a resilient split piston ring provided with a surface oblique to its axis and with ribs projecting from said surface, and a spring ring adapted to engage said ribs and provided with deflected end portions adapted to lie between certain of said ribs.

3. In a piston packing, the combination with a cylinder and piston, the piston having a groove, of a split packing ring seated in said groove with its exterior surface adapted to engage said cylinder and one side adapted to engage a wall of said groove, said ring having a third surface oblique to the first two, said oblique surface provided with ribs, and a resilient ring seated on said ribs and operative to force the split packing ring into engagement with the cylinder and the wall of the groove.

4. In a piston packing, the combination with a cylinder and a piston having a groove of a resilient split ring in said groove adapted to engage the wall of the cylinder and one wall of said groove, said ring provided with a surface oblique to its axis and having ribs formed thereon, and a split spring ring with deflected ends, said last-mentioned ring adapted to lie upon said ribs with its deflected ends positioned between the ribs, and to force said first-mentioned ring into engagement with the cylinder and the wall of the groove.

5. In a piston packing, a cylinder and piston, the latter having a circumferential groove, a single resilient split packing ring seated in said groove and engaging the cylinder wall and one wall of the groove, a split spring expanding ring of approximately triangular section seated in said groove and engaging said split ring and the opposite wall of said groove, bearing surfaces being provided at intervals upon said first mentioned ring upon which said expanding ring is seated.

In testimony whereof I affix my signature.

CHARLES R. SHORT.